United States Patent [19]

Bitter et al.

[11] Patent Number: 4,886,020
[45] Date of Patent: Dec. 12, 1989

[54] ENGINE INDUCTION SYSTEM

[75] Inventors: Rudolf Bitter; Gunter Senff, both of Russelsheim, Fed. Rep. of Germany

[73] Assignee: General Motors Corporation, Detroit, Mich.

[21] Appl. No.: 274,247

[22] Filed: Nov. 21, 1988

[30] Foreign Application Priority Data

Dec. 12, 1987 [DE] Fed. Rep. of Germany ....... 8716461

[51] Int. Cl.$^4$ ............................................. F02B 27/02
[52] U.S. Cl. ................................................. 123/52 M
[58] Field of Search ......... 123/52 M, 52 MB, 52 MF, 123/52 MC, 52 MV

[56] References Cited

U.S. PATENT DOCUMENTS 3,677,240 7/1972 Sarto .
4,538,556 9/1985 Takeda .
4,541,399 9/1985 Tanaka et al. .
4,565,166 1/1986 Takeda .
4,574,748 3/1986 Inoue et al. .
4,628,873 12/1986 Bitter .
4,765,285 8/1988 Kobayashi ...................... 123/52 M Primary Examiner—David A. Okonsky
Attorney, Agent, or Firm—Robert J. Outland

[57] ABSTRACT

An internal combustion engine has a tuned induction system with an air cleaner connected by a conduit with a separate plenum mounted on a manifold with individual runners connecting with the engine cylinders. A throttle body having a throttle to control induction air flow is located between the plenum and the manifold with its runner such that the plenum is not subject to reduced manifold pressures resulting from throttling the air flow.

4 Claims, 1 Drawing Sheet

ENGINE INDUCTION SYSTEM

TECHNICAL FIELD

The invention relates to tuned induction systems for internal combustion engines of the type in which a collector or plenum preceding individual intake runners is connected to an air filter, and in which a throttle body with a throttle valve is provided in order to control the air flow. An internal combustion engine with an induction system of this type is shown in U.S. Pat. No. 4,628,873.

BACKGROUND

In the known internal combustion engine, the plenum is attached to an end wall of the motor vehicle engine compartment. Relatively long intake runners lead rectilinearly from the plenum to the cylinder head. A throttle body with a throttle valve to control the quantity of air is provided at the inlet of the plenum. The air inducted by the internal combustion engine flows from an air intake tube through an air filter and the throttle body into the plenum, and from there through the individual intake runners into associated combustion chambers of the internal combustion engine.

The configuration of the intake system according to the above-mentioned U.S. Pat. No. 4,628,873 provides relatively long intake headers running rectilinearly, which leads to advantageous gas velocity conditions. This results in an increase in torque at low engine speeds, and reduces undesirable exhaust and noise emissions.

For reasons concerning the environmental compatibility of motor vehicles, it is advantageous if they are operated at relatively low engine speeds. However, drivers take advantage of the ability to drive at low to medium engine speeds only if sufficient torque is also available at the same time.

SUMMARY OF THE INVENTION

An object of the invention is therefore that of configuring an internal combustion engine with a tuned induction system of the kind mentioned initially in such a way that the engine has the highest possible torque at medium to low engine speeds.

According to the invention, this object is obtained by locating throttle body at the outlet of the plenum between the plenum and an intake manifold with individual runners.

This very simple configuration results, surprisingly, in a definite improvement in the torque of the internal combustion engine at medium to low engine speeds. In addition, there is a reduction in noise and a decrease in noxious components in the exhaust. A reason for these positive effects is assumed to be the fact that in the arrangement according to the invention, air can flow into the throttle body from a large-volume, unpressurized, non-turbulent plenum volume. In the plenum of the internal combustion engine according to the above-mentioned patent U.S. Pat. No. 4,628,873 the pressure in the plenum is influenced by changes in the setting of the throttle valve and by the intake vacuum of the internal combustion engine, so that the plenum pressure fluctuates.

In one desirable embodiment of the invention, the throttle body along with the intake manifold is mounted on the cylinder head, and the plenum is set directly on the throttle body. With this configuration, it is not necessary to attach the plenum to one wall of the engine compartment, so that the assembly process is simpler.

Air can flow from all directions from the plenum into the throttle body in a uniform manner if the throttle body opens into the plenum at a distance from the side walls of the plenum.

The invention may have many embodiments, one of which is illustrated in the drawing and is described below.

BRIEF DRAWING DESCRIPTION

DETAILED DESCRIPTION

Figure 1:
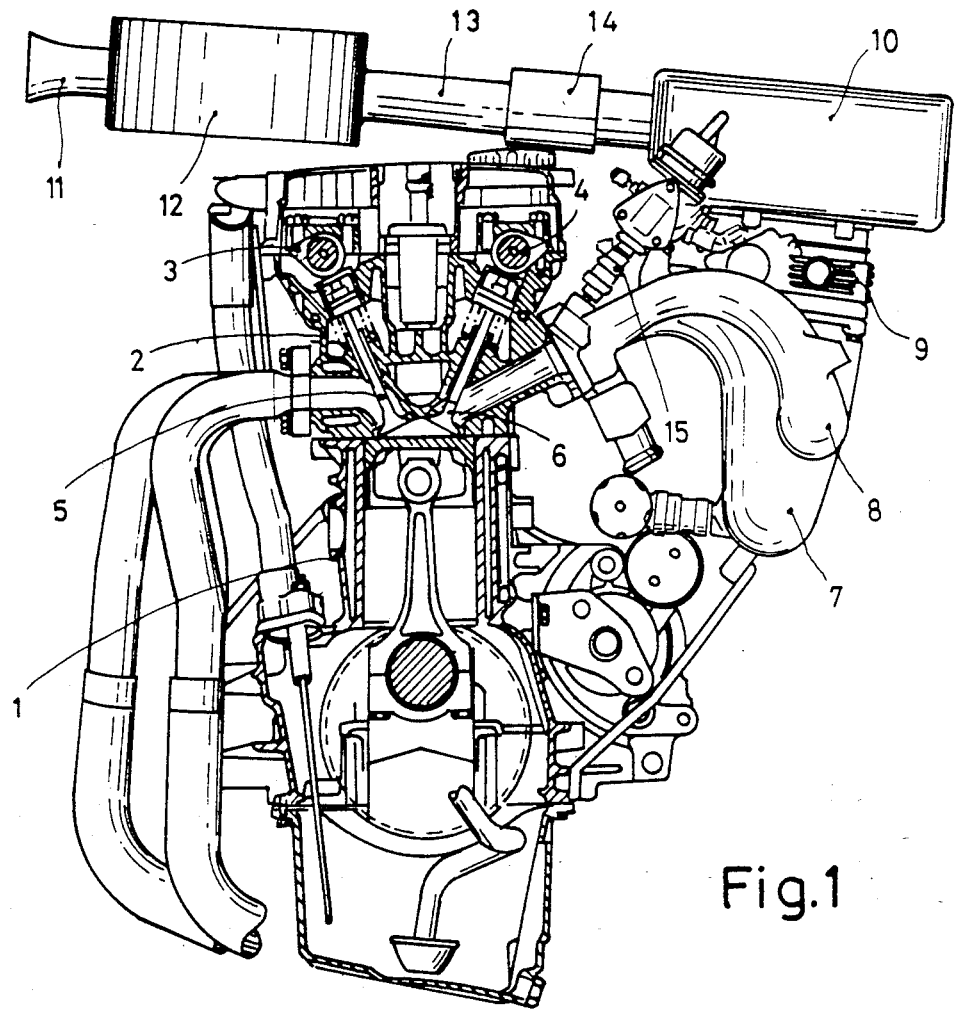
FIG. 1 shows a partially sectioned end view of an internal combustion engine according to the invention.

The internal combustion engine shown in FIG. 1 has a cylinder block 1 on which is mounted a cylinder head 2, with exhaust and intake valves 5, 6 respectively, controlled by camshafts 3, 4.

To the right of the cylinder head 2 in the drawing is an intake manifold with runners 7, 8 which connects upwardly with a throttle body 9. An intake plenum 10 is mounted on the throttle body 9. Combustion air drawn in by the internal combustion engine flows through an intake tube 11 into an air filter 12, from there through a conduit 13 into an airflow meter 14, and then into the plenum 10, from which it passes through the throttle body 9 into the intake manifold and runners 7, 8. The engine is a fuel-injection internal combustion engine having injectors 15, by means of which fuel is injected into the intake runners 7, 8 as shown in FIG. 1.

Figure 2:
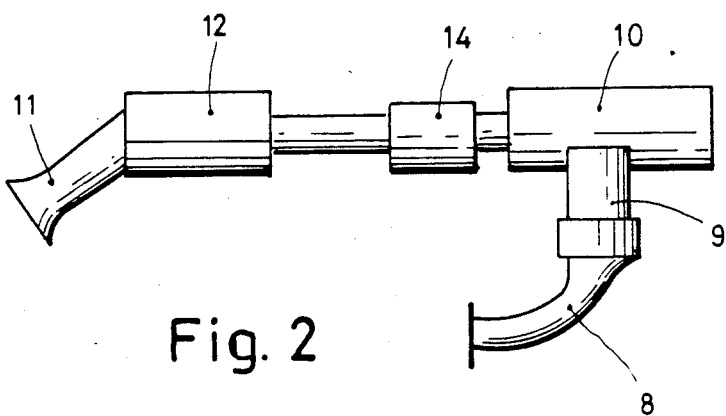
FIG. 2 shows schematically a portion of the induction system of the internal combustion engine according to FIG. 1.

FIG. 2 shows how air flows from the intake tube 11 to one of the intake runners 8. Note that the throttle body 9 opens into the plenum 10 at a distance from the side walls of the plenum 10. As a result, air can flow uniformly from all sides into the throttle body 9.

The embodiments of the invention in which an exclusive property or privilege is claimed are defined as follows:

1. An internal combustion engine having an induction system with a plenum disposed upstream of intake runners, said plenum being connected in series with an upstream air filter and having a throttle body with a throttle valve to control intake air flow, characterized in that the throttle body (9) is located directly at the outlet of the plenum (10) between the plenum (10) and a manifold including the intake runners (7, 8).

2. An internal combustion engine according to claim 1, characterized in that the throttle body (9), along with the manifold and intake runners (7, 8) is mounted on the cylinder head (2), and that the plenum (10) is set directly on the throttle body (9).

3. An internal combustion engine according to claim 2, characterized in that the throttle body (9) opens into the plenum (10) at a location spaced from the side walls of the plenum (10).

4. An internal combustion engine having an induction system with a plenum disposed upstream of and defining a sole flow path to intake runners, said plenum being connected in series with an upstream air filter and having a throttle body with a throttle valve to control intake air flow, wherein the throttle body (9) is located at the outlet of the plenum (10) between the plenum (10) and a manifold including the intake runners (7, 8).

* * * * *